United States Patent
Geller

(10) Patent No.: US 10,345,079 B2
(45) Date of Patent: Jul. 9, 2019

(54) DEVICE FOR ESTABLISHING OR RELEASING A COUPLING

(71) Applicant: Leica Camera AG, Wetzlar (DE)

(72) Inventor: Reiner Geller, Wetzlar (DE)

(73) Assignee: Leica Camera AG, Wetzlar (DE)

( * ) Notice: Subject to any disclaimer, the term of this patent is extended or adjusted under 35 U.S.C. 154(b) by 0 days.

(21) Appl. No.: 15/446,523

(22) Filed: Mar. 1, 2017

(65) Prior Publication Data

US 2017/0254624 A1   Sep. 7, 2017

(30) Foreign Application Priority Data

Mar. 3, 2016   (DE) .................. 10 2016 103 893

(51) Int. Cl.
| | |
|---|---|
| *F41G 11/00* | (2006.01) |
| *F41G 1/38* | (2006.01) |
| *F41G 1/18* | (2006.01) |
| *F41G 1/22* | (2006.01) |
| *G02B 27/36* | (2006.01) |

(52) U.S. Cl.
CPC .............. *F41G 11/007* (2013.01); *F41G 1/18* (2013.01); *F41G 1/22* (2013.01); *F41G 1/38* (2013.01); *G02B 27/36* (2013.01)

(58) Field of Classification Search
CPC . F41G 1/38; F41G 1/387; F41G 1/393; F41G 11/005; F41G 11/007; F41G 1/18; F41G 1/22; G02B 27/36
USPC .......................... 42/124, 125, 126, 127, 128
See application file for complete search history.

(56) References Cited

U.S. PATENT DOCUMENTS

| | | | | |
|---|---|---|---|---|
| 2,583,042 | A * | 1/1952 | Dayton | F41G 1/38 42/122 |
| 4,132,129 | A | 1/1979 | Pratt | |
| 4,779,305 | A * | 10/1988 | Gorsek | G05G 1/082 16/441 |
| 5,513,440 | A * | 5/1996 | Murg | F41G 1/26 33/298 |
| 6,696,915 | B2 | 2/2004 | Pan | |
| 9,062,934 | B1 * | 6/2015 | Presley | F41G 1/387 |
| 2006/0268433 | A1 * | 11/2006 | Thomas | F41G 1/38 359/811 |
| 2012/0154907 | A1 | 6/2012 | Schmitt et al. | |
| 2012/0167444 | A1 * | 7/2012 | Adkins | F41G 1/38 42/135 |

(Continued)

FOREIGN PATENT DOCUMENTS

DE   10 2010 061 349 A1   6/2012

*Primary Examiner* — Bret Hayes
(74) *Attorney, Agent, or Firm* — Crowell & Moring, LLP

(57) ABSTRACT

A device is provided for establishing or releasing the coupling between an adjustment ring, which can be rotated on a base element by way of a detent mechanism and is provided with an adjustment shaft for optical elements, and a cylindrical index ring, which is inserted between the adjustment ring and the base element so as to rotate in relation to an index mark provided on the base element, wherein an inwardly directed ring surface is integrally formed on the edge of the index ring pointing toward the adjustment ring, at least one friction element under spring pressure is inserted between the adjustment ring and the ring surface, and the spring pressure can be removed by way of a pressure element inserted into the top face of the adjustment ring or by way of a lever mechanism.

7 Claims, 2 Drawing Sheets

(56) References Cited

U.S. PATENT DOCUMENTS

| | | | |
|---|---|---|---|
| 2014/0002815 A1* | 1/2014 | Jaeschke | F41G 1/38 |
| | | | 356/247 |
| 2014/0165782 A1 | 6/2014 | Windauer | |
| 2014/0196351 A1* | 7/2014 | Campean | G05G 1/082 |
| | | | 42/119 |
| 2015/0146289 A1* | 5/2015 | Ingenito | F41G 1/38 |
| | | | 359/429 |
| 2016/0169672 A1* | 6/2016 | Oettl | F41G 1/38 |
| | | | 356/247 |

* cited by examiner

DEVICE FOR ESTABLISHING OR RELEASING A COUPLING

CROSS-REFERENCE TO RELATED APPLICATION

This application claims priority to German Patent Application 10 2016 103 893.8, filed Mar. 3, 2016, the entire contents of which are incorporated by reference herein.

BACKGROUND OF THE INVENTION

The invention relates to a device for establishing or releasing a coupling between an adjustment ring, which can be rotated on a base element by way of a detent mechanism and is provided with an adjustment shaft for optical elements, and a cylindrical index ring, which is inserted between the adjustment ring and the base element so as to rotate in relation to an index mark provided on the base element.

On telescopic sights, it is known to vary the elevation of the aiming point on a reticle provided in the optical path of the telescopic sight by way of an adjustment ring that can be latched onto the outside of the telescopic sight on a base element. The elevation is dependent upon the target distance and the ammunition fired at the aiming point. In the case of a telescopic sight mounted on a barrel, the elevation is thus typically set on the adjustment ring by a person skilled in the art for a standardized target distance and customarily used ammunition, and is zeroed with the aid of an index ring coupled to the adjustment ring in relation to an index mark provided on the base element.

The detent positions of the adjustment ring correspond to a standardized, incrementally variable target distance. The individual detent positions can be felt and heard by a clicking sound, so that the shooter is also able to discern the changed target distance even in the dark.

The aforementioned index ring is coupled to the adjustment ring, so that the change in the detent positions can also be read optically via the change in the setting of the index ring in relation to the index mark, and the adjustment ring can be returned to the zeroed starting position when the use of the firearm has been completed.

The elevation of the reticle must likewise be adapted when a change in the ammunition type occurs. Via the typical trajectory of the ammunition type, this adaptation likewise affects the target distance which was set by way of the adjustment ring and to which the zero position of the index ring must be adapted when the different ammunition type continues to be used.

It is known to effectuate the coupling between the adjustment ring and the index ring by way of mutual interlocking. The interlocking mechanism can be released by manually pulling the adjustment ring or with the aid of a tool, and can be re-established in a different relative position. Due to the engagement in the teeth, only discrete changes in the relative position are possible, which influence the accuracy of the setting of the reticle to the standardized target distance.

It is therefore the object of the invention to be able to set, in particular continuously, the coupling between the adjustment ring and the index ring in a device of the type mentioned above, without using a special tool.

SUMMARY OF THE INVENTION

According to the invention, this object is achieved by the features described in this specification and in the claims.

As an essential measure, the index ring is, for this purpose, provided on the edge pointing toward the adjustment ring with an inwardly directed ring surface, and a spring pressure-loaded friction element is inserted between the adjustment ring and the ring surface. The spring pressure can be removed by way of a pressure element inserted into the top face of the adjustment ring. After the friction pressure has been removed, the index ring can be continuously rotated in relation to the adjustment ring. As soon as the pressure element is no longer actuated, the coupling is automatically re-established under spring pressure.

The pressure element can be rigidly connected to a pressure plate, which counteracts a spring pressure exerted on the ring surface at the index ring. The pressure element, however, can also be designed as a two-arm lever mechanism, having one lever arm seated against the friction element under spring pressure and having the other lever arm pressed into the adjustment ring against the spring pressure.

BRIEF DESCRIPTION OF THE DRAWINGS

The invention will be described hereafter based on schematically illustrated exemplary embodiments. In the drawings.

DETAILED DESCRIPTION OF THE DRAWINGS

Figure 1A:
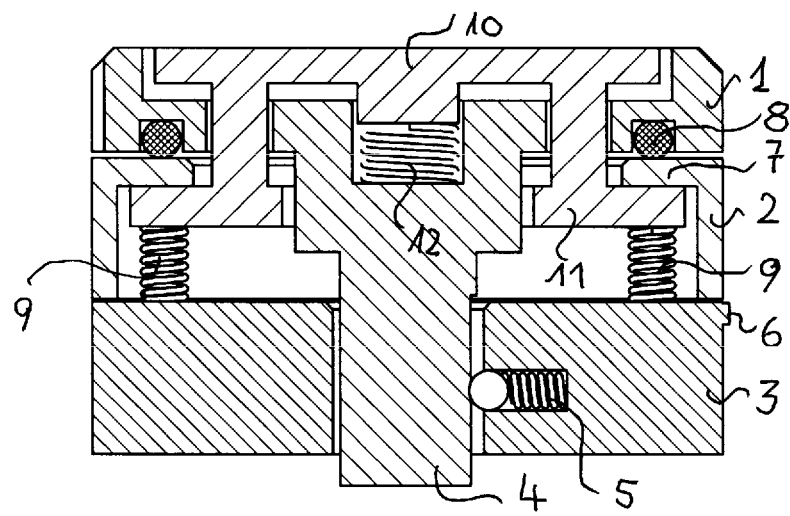
FIG. 1A shows an adjustment ring together with a pressure plate when coupled.

In the exemplary embodiment shown in FIG. 1A, an adjustment ring 1, a cylindrical index ring 2, and a base element 3 are arranged rotatably with respect to one another in the manner known per se. An adjustment shaft 4 connected to the adjustment ring 1 is used to adjust, through the base element 3, an optical element, which is not shown in greater detail, in particular the elevation of a reticle in the optical path of a telescopic sight. The rotation of the adjustment shaft 4 may be secured in discrete settings by way of a detent mechanism 5 and can be felt by the latching engagement and heard by a clicking sound. The current rotational position may also be read visually on the scale of the index ring 2 in relation to the index mark 6 provided on the base element 3.

According to the invention, an inwardly directed ring surface 7 may be integrally formed on the edge of the index ring 2 pointing toward the adjustment ring 1.

A friction element 8 may be inserted between the adjustment ring 1 and the ring surface 7. An O-ring or individual friction pads may be provided as the friction element 8.

The friction element 8 may be held by way of friction pressure between the ring surface 7 and the adjustment ring 1 under the pressure of a preloaded spring element 9. In the illustrated exemplary embodiment, two spring elements 9 are shown in the cross-section of the device. It is also possible, of course, for additional spring elements 9 to be distributed across the circular surface of the base element 3.

Figure 1B:
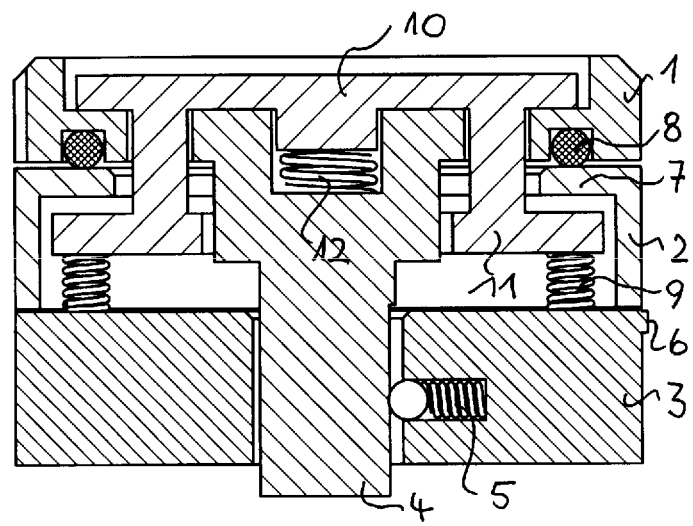
FIG. 1B shows the device according to FIG. 1A when decoupled.

A pressure element 10, which is rigidly connected to a pressure plate 11, may inserted into the top face of the adjustment ring 1 for releasing the coupling state that exists under friction pressure. The pressure plate 11 engages in the space between the lower face of the ring surface 7 and the spring element 9. Manual pressing of the pressure element 10 into the adjustment ring 1 thus further compresses the spring element 9, and as a result, the friction pressure acting on the friction element 8 may be eliminated, or at least reduced so much that a manual rotation of the index ring 2 in relation to the adjustment ring 1 is made possible as illustrated in FIG. 1B.

After the pressure element 10 is released, the spring elements 9 again push the pressure plate 11 against the lower face of the ring surface 7, and the coupling of the index ring 2 is re-established by the friction pressure acting on the friction element 8. The lifting of the pressure element 10 into the starting position may be supported by a separate spring element 12, which may be inserted between the adjustment shaft 4 and the pressure element 10 here.

Figure 2A:
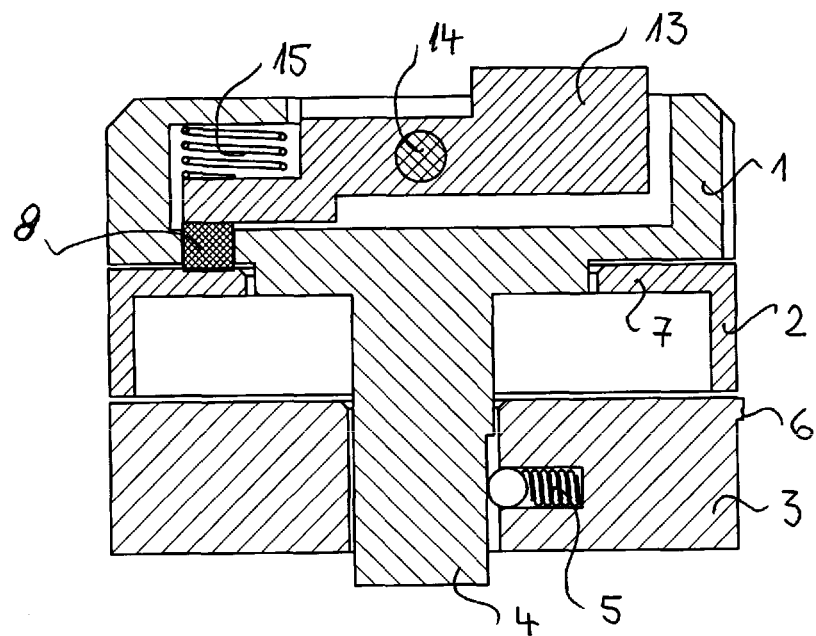
FIG. 2A shows an adjustment ring together with a lever mechanism when coupled.

In the exemplary embodiment shown in FIG. 2A, a two-arm lever mechanism 13, which can be actuated from above, may be arranged in the adjustment ring 1 so as to generate the friction pressure between the adjustment ring 1 and the ring surface 7 at the index ring 2. The lever mechanism 13 may be mounted in the adjustment ring 1 so as to pivot about a rotational axis 14.

Figure 2B:
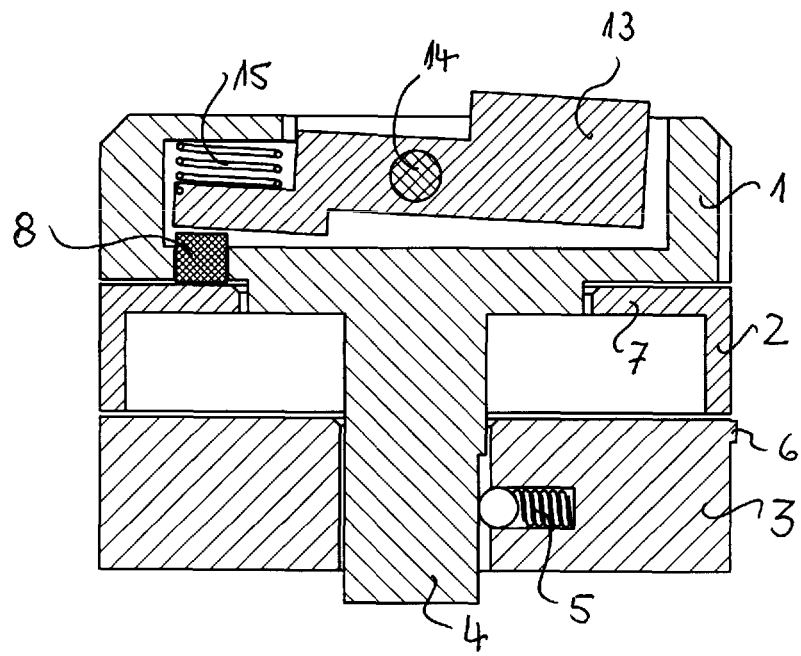
FIG. 2B shows the device according FIG. 2A when decoupled.

The lever arm of the lever mechanism 13 acting on the friction element 9, which is represented as a single pad here, may subjected to the pressure of a spring element 15, which may be braced on an upper surface in the adjustment ring 1 extending there across. Manual pressure on the other lever arm presses the same into the adjustment ring 1 and removes the friction pressure acting on the friction element 9 as illustrated in FIG. 2B.

To support the return of the manually actuated lever arm, an additional spring element, which is not shown here, may be inserted between the lever arm and the base plate of the adjustment ring 1. Instead of the one friction pad, it is also possible to distribute multiple friction elements 9 over the circumference of the ring surface 7 and hold these under friction pressure by way of an appropriate configuration of the associated lever arm.

LIST OF REFERENCE NUMERALS 1 adjustment ring
2 index ring
3 base element
4 adjustment shaft
5 detent mechanism
6 index mark
7 ring surface
8 friction element
9 preloaded spring element
10 pressure element
11 pressure plate
12 separate spring element
13 two-arm lever mechanism
14 rotational axis
15 spring element The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device that establishes or releases a coupling, comprising:
    a base element having an index mark provided thereon;
    a detent mechanism;
    an adjustment ring, which is rotatable on the base element, the adjustment ring being secured in place via the detent mechanism and having an adjustment shaft for optical elements;
    a cylindrical index ring, which is inserted between the adjustment ring and the base element so as to rotate in relation to the index mark;
    an inwardly directed ring surface integrally formed on an edge of the cylindrical index ring pointing toward the adjustment ring;
    at least one o-ring that is inserted between the adjustment ring and the inwardly directed ring surface; and
    a pressure element that is inserted into a top face of the adjustment ring, wherein
    a spring pressure is removable via the pressure element.

2. The device of claim 1, further comprising at least one preloaded spring element used to generate the spring pressure between the inwardly directed ring surface and the base element;
    wherein the pressure element is rigidly connected to a pressure plate, the pressure plate engaging in a space between the spring element and the inwardly directed ring surface, so as to remove the spring pressure.

3. The device of claim 2, further comprising a separate preloaded spring element inserted between the pressure element and the adjustment shaft or the base element.

4. The device of claim 2, wherein the pressure element is a two-arm lever mechanism mounted in the adjustment ring, having one lever arm seated against the at least one o-ring under preloaded spring pressure, and having another lever arm that can be pressed into the adjustment ring so as to remove the spring pressure acting on the at least one o-ring.

5. The device of claim 4, wherein the one lever arm is shaped as a planar segment of a circle or as a full circle.

6. A telescopic sight comprising:
    an optical element;
    an adjustment ring;
    a cylindrical index ring;
    a base element;
    an adjustment shaft;
    a detent mechanism;
    at least one o-ring;
    a first pressure element; and
    a second pressure element;
    wherein
        the adjustment ring is rotatable on the base element and secured in place via the detent mechanism,
        the cylindrical index ring is inserted between the adjustment ring and the base element so as to rotate in relation to an index mark provided on the base element,
        the adjustment shaft is connected to the adjustment ring and is used to adjust, through the base element, the optical element,
        an inwardly directed ring surface is integrally formed on an edge of the index ring pointing toward the adjustment ring,
        the at least one o-ring is subject to pressure generated by the first pressure element and is inserted between the adjustment ring and the inwardly directed ring surface, and
        the pressure applied via the first pressure element is removable by way of the second pressure element inserted into a top face of the adjustment ring.

7. The telescopic sight of claim 6, wherein the first pressure element is a spring, and the second pressure element is a spring.

\* \* \* \* \*